(12) United States Patent
Wang et al.

(10) Patent No.: US 9,367,640 B2
(45) Date of Patent: Jun. 14, 2016

(54) METHOD AND SYSTEM FOR CREATING LINKED LIST, METHOD AND SYSTEM FOR SEARCHING DATA

(75) Inventors: Zuo Wang, Beijing (CN); Chentao Yu, Beijing (CN)

(73) Assignees: BEIJING LENOVO SOFTWARE LTD, Haidian District, Beijing (CN); LENOVO (BEIJING) CO., LTD., Haidian District, Beijing (CN)

( * ) Notice: Subject to any disclaimer, the term of this patent is extended or adjusted under 35 U.S.C. 154(b) by 311 days.

(21) Appl. No.: 13/505,635

(22) PCT Filed: Dec. 24, 2010

(86) PCT No.: PCT/CN2010/080220
§ 371 (c)(1),
(2), (4) Date: May 2, 2012

(87) PCT Pub. No.: WO2011/079748
PCT Pub. Date: Jul. 7, 2011

(65) Prior Publication Data
US 2012/0265776 A1    Oct. 18, 2012

(30) Foreign Application Priority Data

Dec. 31, 2009  (CN) .......................... 2009 1 0243188

(51) Int. Cl.
*G06F 17/30* (2006.01)

(52) U.S. Cl.
CPC .... *G06F 17/30902* (2013.01); *G06F 17/30958* (2013.01)

(58) Field of Classification Search
CPC .................... G06F 17/30958; G06F 17/30902
USPC .................................................. 707/758, 800
See application file for complete search history.

(56) References Cited

U.S. PATENT DOCUMENTS 5,950,191 A * 9/1999 Schwartz ...................... 707/758
6,581,063 B1 * 6/2003 Kirkman
(Continued)

FOREIGN PATENT DOCUMENTS

| CN | 1780228 | 5/2006 |
| CN | 1926500 | 3/2007 |

(Continued)

OTHER PUBLICATIONS

PCT/CN2010/080220 International Search Report dated Feb. 24, 2011 (2 pages).
(Continued)

*Primary Examiner* — Jensen Hu
(74) *Attorney, Agent, or Firm* — Brinks Gilson & Lione; G. Peter Nichols

(57) ABSTRACT

A method and system for creating a linked list and a method and system for searching data are disclosed. The method for creating the linked list includes obtaining a first linked list from a first storage area, in which the first linked list has at least one node, and each node at least includes first data; obtaining the first data of each node from the linked list; storing the first data into a preset second storage area and forming a second linked list. The method stores the node identifiers and the node pointers of the linked list preferentially using the continuous storage area, such that the times of cache updating which is triggered by the traverse operation are reduced, and the access speed of the accessed data is increased.

8 Claims, 6 Drawing Sheets

(56) References Cited

U.S. PATENT DOCUMENTS

| | | | |
|---|---|---|---|
| 7,685,121 B2* | 3/2010 | Brown et al. | 707/999.006 |
| 2005/0111353 A1* | 5/2005 | Zievers | 370/229 |
| 2006/0087990 A1* | 4/2006 | Kakivaya | H04L 45/02 370/299 |
| 2008/0033952 A1* | 2/2008 | McKenney et al. | 707/8 |

FOREIGN PATENT DOCUMENTS

| | | |
|---|---|---|
| CN | 101221538 | 7/2008 |
| CN | 101276334 | 10/2008 |
| CN | 101321349 | 12/2008 |
| CN | 101478652 | 7/2009 |

OTHER PUBLICATIONS

PCT/CN2010/080220 International Preliminary Report on Patentability dated Jul. 4, 2012 (5 pages).

Second Office Action dated Dec. 25, 2012 from corresponding Chinese Application No. CN 200910243188.1 (10 pages including English translation).

Third Office Action dated Jun. 20, 2013 from corresponding Chinese Application No. CN 200910243188.1 (13 pages including English translation).

Rejection Decision dated Jan. 8, 2014 from corresponding Chinese Application No. CN 200910243188.1 (12 pages including English translation).

* cited by examiner

METHOD AND SYSTEM FOR CREATING LINKED LIST, METHOD AND SYSTEM FOR SEARCHING DATA

TECHNICAL FIELD

The present invention relates to the field of computer; and more particularly, to a method and system for creating a linklist and a method and system for searching data.

BACKGROUND

A linklist is a common manner for organizing ordered data. It connects a series of data nodes as one data chain by a point and is an important way for realizing a linear list. A large number of linklist structures, which include apparatus lists and data organizations in various functional modules, are used in the core of Linux to organize data.

Apparently, the linklist is of better dynamism and capable of allocating spaces randomly. Knowledge of total amount of data is not needed in advance when the linklist is built. It is also possible to insert data in or delete data from any position in the linklist efficiently. An ordering property of the linklist causes traversal to be the operation most commonly used for the linklist. There are only two kinds of data that a traversal operation accesses frequently: node identifications and node pointers (only "next" pointer is used in a one-way linklist, while both "next" pointer and "pre" pointer are used in a two-way linklist).

The node identifications or the node pointers occupy a little memory; however, the identifications or the pointers of different nodes in the linklist are rarely located in the same line of the same physical page, wherein the same line means a segment of data, the length of which equals to that of a cache line inside a processor and which is aligned in the physical page. For example, assuming that the length of the cache line is 16 bytes, a memory is then divided into multiple segments, each being aligned data, with addresses whose last 4 bits are all 0. The data with addresses of 0x19ded0-0x19dedF is an aligned segment of data. The line in which certain data accessed by the processor locates will be loaded into the cache when this certain data is not in the cache, thus avoiding acquiring data from the memory every time.

During implementation of the present invention, the inventor analyzed features of the linklist carefully and found that the following problems exist in the related art.

The ordering property of accessing of the linklist and the discreteness of the linklist structure make it difficult for the linklist to be run on the processor efficiently. Since the identifications or the pointers of different nodes in the linklist are rarely located in the same line of the same physical page, data updating for a certain cache line may be triggered each time one node is traversed, so that not only the cache cannot be utilized in the traversal operation effectively, but also data of other applications In the data cache is likely to be eliminated, thus the performance of the entire system is affected.

SUMMARY

A technical problem that the present invention seeks to solve is a need of providing a method and system for creating a linklist so as to improve the efficiency for accessing data.

In order to solve the technical problem mentioned above, the present invention provides a method for creating a linklist, comprising:

acquiring a first linklist from a first storage area, said first linklist having at least one node, each node including at least first data;

acquiring said first data of each of said node from said first linklist; and storing said first data in a preset second storage area to form a second linklist.

Optionally, said first data comprises identification information and a pointer of said node.

Optionally, said first storage area corresponds to a first accessing speed and said second storage area corresponds to a second accessing speed;

wherein said second accessing speed is higher than said first accessing speed.

Optionally, said second storage area is a consecutive storage space.

Optionally, the method further comprises:

allocating a third storage area when said second storage area is not enough to continue storing said second linklist; and copying said second linklist in said second storage area into said third storage area, wherein the space of said third storage area is larger than that of said second storage area.

In order to solve the technical problem mentioned above, the present invention also provides a system for creating a linklist, comprising:

a first acquiring module, configured for acquiring a first linklist from a first storage area, said first linklist having at least one node, each node including at least first data;

a second acquiring module, configured for acquiring said first data of each node from said first linklist;

a presetting module, configured for presetting a second storage area; and a storing module, configured for storing said first data in said second storage area to form a second linklist.

Optionally, said presetting module is configured for presetting a consecutive storage space as said second storage area.

Optionally, said first storage area corresponds to a first accessing speed and said second storage area corresponds to a second accessing speed;

wherein said second accessing speed is higher than said first accessing speed.

Optionally, the system, further comprises:

an allocating module, configured for allocating a third storage area when said second storage area is not enough to continue storing said second linklist; and a copying module, configured for copying said second linklist in said second storage area into said third storage area, wherein the space of said third storage area is larger than that of said second storage area.

Another technical problem that the present invention seeks to solve is to provide a method and system for searching data so as to search data.

In order to solve the technical problem mentioned above, the present invention provides a method for searching data, comprising:

acquiring a first linklist from a first storage area, said first linklist having at least one node, each of said node including at least first data and second data;

acquiring said first data of each of said node from said first linklist;

storing said first data of each of said node in a preset second storage area to form a second linklist;

receiving searching data;

comparing said searching data with said first data of each of said node in said second linklist according to a preset comparison policy; and acquiring the second data of the node to which specific first data matching with said searching data belongs when said specific first data exists.

In order to solve the technical problem mentioned above, the present invention also provides a system for searching data comprising:

a first acquiring module for acquiring a first linklist from a first storage area, said first linklist having at least one node, each of said node including at least first data and second data;

a second acquiring module for acquiring said first data of each of said node from said first linklist;

a first presetting module, configured for presetting a second storage area;

a storing module, configured for storing said first data of each of said node in said second storage area to form a second linklist;

a receiving module, configured for receiving searching data;

a second presetting module, configured for presetting a comparison policy;

a comparing module, configured for comparing said searching data with said first data of each of said node in said second linklist according to said comparison policy; and a third acquiring module, configured for acquiring the second data of the node to which specific first data matching with said searching data belongs when said specific first data exists, In comparison with the related art, the present invention is directed to the ordering property of accessing of the linklist and the discreteness of the linklist structure. It retains node identifications and node pointers using a consecutive storage area optionally, thus decreasing the number of cache updating triggered by the traversal operation, improving the speed of accessing data, and solving the problem that the cache updating is frequently triggered by operations of the linklist.

Other feathers and advantages of the present invention will be set forth in the following specification, and become apparent partly from the specification or be understood through implementation of the present invention. Objects and other advantages of the present invention can be achieved and obtained with structures particularly indicated in the specification, claims and accompanying drawings.

BRIEF DESCRIPTION OF THE DRAWINGS

Together with embodiments of the present invention, accompanying drawings which are used to provide a further understanding of the present invention and constitute a part of this specification serve to explain the present invention; however they do not constitute a limitation of the present invention. In the accompanying drawings.

DETAILED DESCRIPTION

Hereinafter, specific modes for carrying out the invention will be described in detail with reference to the accompanying drawings and embodiments, thereby it can be fully understood about the implementation procedures how the present invention applies technical means to solve the technical problems and achieve technical effects, and the present invention can be thus embodied.

It should be clarified that the embodiments of the present invention and various features therein can be combined with each other and they are all within the protective scope of the present invention if not colliding with each other. In addition, steps shown in the flowcharts in the accompanying drawings can be executed in a computer system as a set of computer executable instructions. Although a logical order is shown in the flowcharts, the shown or described steps can be executed in different orders from those disclosed herein under certain circumstances.

The core of the present invention lies in extracting data from a node of a first linklist and retaining the same in a preset storage area to form a second linklist. In the case of storing in the new linklist a part of data that an electrical apparatus would access, work efficiency can be significantly improved at least when the electrical apparatus accesses the part of data.

Wherein, the second linklist may either replace the first linklist or be a linklist newly set.

Wherein, the data that the electrical apparatus would access includes a pointer and an identification of each node.

Wherein, in order to save storage space, the storage area is optionally a consecutive storage area.

Wherein, the preset storage area may be enlarged to form a new current storage area, so as to store more data that the electrical apparatus would access when the preset storage area has been filled up; this enlargement may be enlarging the storage area to become twice as large as the current storage area every time, and data in the current storage area before enlarging is copied into the new current storage area and the previous storage area is released.

Data is retained in units of nodes in a traditional linklist. Data members inside the nodes are retained consecutively from each other, but the nodes are not retained consecutively from each other. Because the data (e.g., 128 bytes) loaded into a cache line at one time is data consecutively retained, in the present embodiment, a consecutive storage area is preset to form the second linklist, so that it can be guaranteed that data can be loaded as many as possible in one cache updating. Obviously, the preset storage space may be inconsecutive as well; however, the operation efficiency will be slightly affected during the storage and subsequent reading of the data.

Figure 1:
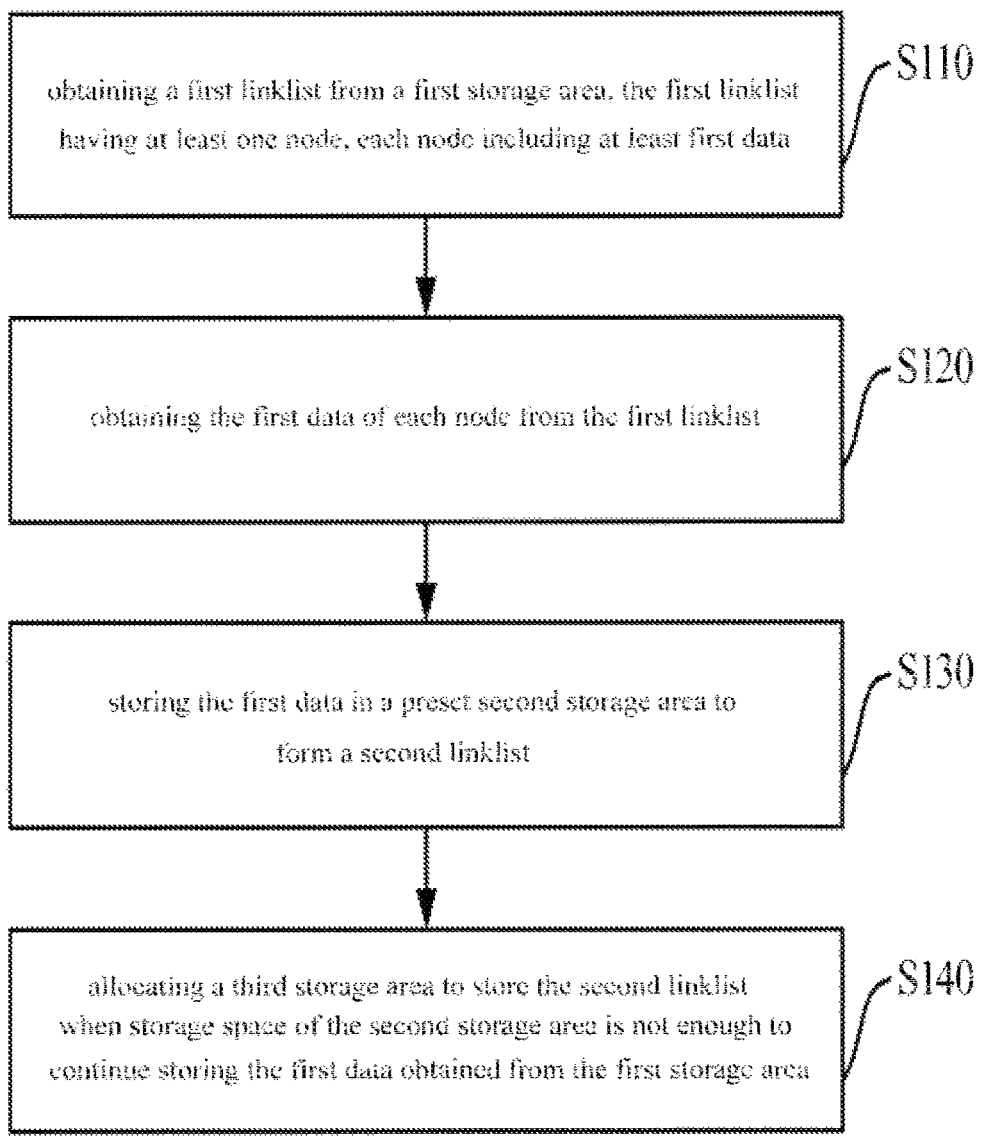
FIG. 1 is an illustrative flowchart of a creation method according to an embodiment of the present invention.

FIG. 1 is an illustrative flowchart of a creation method according to an embodiment of the present invention. As shown in FIG. 1, the creation method according to the present embodiment may include the steps of:

in step S110, acquiring a first linklist from a first storage area, the first linklist having at least one node, each node including at least first data;

in step S120, acquiring the first data of each node from the first linklist;

in step S130, storing the first data in a preset second storage area to form a second linklist; and in step S140, allocating a third storage area to store the second linklist when storage space of the second storage area is not enough to continue storing the first data acquired from the first storage area, wherein the storage space of the third storage area is optionally twice as large as that of the second storage area.

The first storage area corresponds to a first accessing speed while the second storage area corresponds to a second accessing speed, and the second accessing speed is higher than the first accessing speed, thereby it is possible to further improve the speed at which the electrical apparatus reads data, and thus to improve the work efficiency.

It should be indicated that, through the operation of the above-mentioned step S140, it is enabled to continue storing the second linklist when the storage space of the second storage area is not sufficient. However, the step S140 is not necessary in the creation method according to the embodiment of the present invention. That is to say, the creation method according to the embodiment of the present invention may only include the steps of:

in step S110, acquiring a first linklist from a first storage area, the first linklist having at least one node, each node including at least first data;

in step S120, acquiring the first data of each node from the first linklist; and in step S130, storing the first data in a preset second storage area to form a second linklist.

Figure 2:
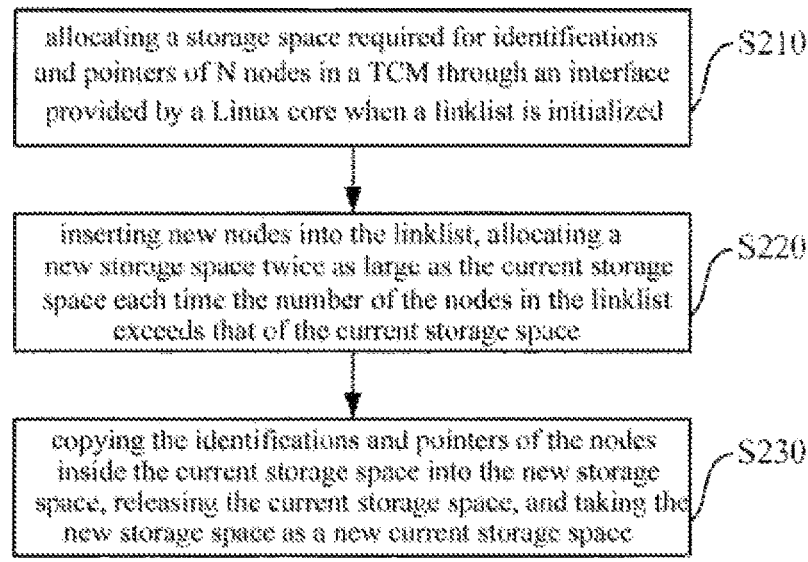
FIG. 2 is an illustrative flowchart of an instance of applying the Creation method according to an embodiment of the present invention.

FIG. 2 is an illustrative flowchart of an instance of applying the creation method according to an embodiment of the present invention. Taking an ARM platform as an example, the application instance of this creation method retains identifications of nodes and node pointers using a consecutive storage area, and simulates the actions of the linklist. As shown in FIG. 2, the application instance mainly includes the steps of:

in step S210, allocating a storage area required for identifications and pointers of N nodes in a tightly coupled memory (TCM) through an interface provided by a Linux core when a linklist is initialized in the present application instance, the TCM, the accessing speed oh which is close to that of a cache, is a high speed RAM inside an ARM chip, thus improving the accessing speed of data stored therein in comparison with the linklist in the related art;

in step S220, the number of the nodes in the linklist gradually increases with the insertion of new nodes into the linklist by a user; allocating a new storage area twice as large as the current storage area each time the number of the nodes in the linklist exceeds the capacity of the current storage area;

in step S230, copying the identifications and pointers of the nodes inside the current storage area into the new storage area, releasing the current storage area, and taking the new storage area as a new current storage area to continue accepting an operation of inserting a new node into the linklist by the user.

In step S220, since the TCM is a valuable storage source of the system, it is used limitedly in the embodiment of the present invention. If the current storage area is the storage area initially allocated in the TCM for storing the identifications and the pointers of the N nodes, for example, the system invoking is used to allocate the storage area required for identifications and pointers of 2*N nodes in a main storage area, copy the identifications and pointers of the N nodes in the TCM into the storage area newly allocated, and take the newly allocated main storage area as the current storage area to continue accepting an insertion of a new node into the linklist by the user, in order not to continue occupying the valuable source of the TCM, when the number of the nodes of the linklist has reached N and is about to become N+1 from N. Deducing the rest from this, the storage area will be doubled by employing the manner of multiplication each time the number of the nodes in the linklist is going to exceed the number of the nodes that the current storage area could accommodate. Obviously, the storage area can also be enlarged several times in TCM. If the number of the nodes inserted into the linklist keeps increasing, no more new storage area will be allocated in the TCM. Instead, a new storage area is allocated in the main storage area of the system by using system invoking, and the nodes stored in the TCM are copied into the new storage area in the system memory and the storage area in the TCM is released at the same time.

Figure 3:
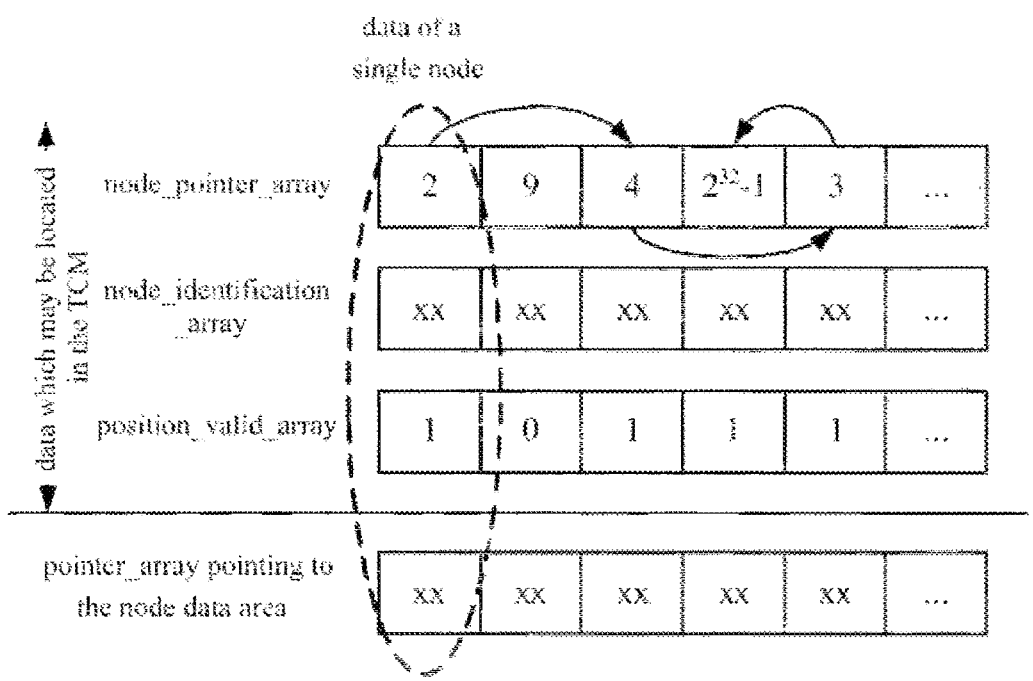
FIG. 3 is an illustrative structural diagram of a linklist structure of node identifications and pointers stored by the creation method according to an embodiment of the present invention.

FIG. 3 is an illustrative diagram of a linklist structure storing node identifications and pointers by employing the creation method according to an embodiment of the present invention. Combining the embodiment shown in FIG. 1 with the method application instance shown in FIG. 2, FIG. 3, taking a one-way linklist as an example, illustrates how to simulate operations of the linklist in a consecutive storage area. Assuming that the size of a node pointer is 32-bit, that of a node identification is 32-bit, and that of a single element in a position valid array is 8-bit. The purpose of this assumption is to be readily understood that a node pointer and a node identification can be denoted by 32 bits of unsigned integer type,(unsigned int), and a single element in the position valid array can be denoted by character type (char). Practically, a user can save space by using bits instead of chars, and a user may also flexibly define the length of the node identification according to the particular requirement. On the basis of the above assumption, the upper limit of the number of the nodes in the linklist is for example specified as $2^{32}$-1 and the number of the nodes when the linklist is initialized is specified as 32.

In the consecutive storage area, the node identifications are stored in a node identification array, the node pointers are stored in a node pointer array in which it is denoted that the end of the linklist is reached when the value of the node pointer is $2^{32}$-1, and the position valid array identifies whether the corresponding position in the consecutive storage area is free. For example, position valid array[1]=0 denotes that the position whose index in the storage area is 1 is free. According to the above definition it is denoted in FIG. 3 that the linklist has 4 nodes, whose indices in the consecutive storage area are 0, 2, 4, and 3 respectively in term of the order in the linklist.

From the viewpoint of the user, in addition to the node pointer and the node identification, the data contained in a single node includes some data defined by the user himself/herself, which is called as a node data area in this application. When a node is constructed, a node data area is allocated from a stack, and the pointer pointing to the node data area is stored in the pointer array of the node data area. The position valid array and the node pointer array are controlled by the internal operations of the linklist class, thus the user cannot modify these data directly.

In the illustrative structural diagram of the linklist shown in FIG. 3, three arrows denote the order that the nodes are located in the linklist. The data of a single node is denoted by a dashed ellipse therein.

For the linklist shown in FIG. 3, there are two manners for implementing traversal.

The First Manner

The traversal of said linklist is achieved in the order of the nodes in the linklist according to the values of the node identification array and the values of the node pointer array. In particular, the node whose index is 0 is inquired first, and if a mismatch is determined, the data in the node pointer array[0] (the value thereof is 2) is read. Then the node whose index is 2 is inquired, and if a mismatch is determined, the data in the node pointer array[2] (the value thereof is 4) is read. The traversal continues analogically until the target node is found, and the index of the target node in the consecutive storage area is returned.

The Second Manner

The node in the array is inquired directly with the indices of the node identification array and the position valid array, as shown below. The searching speed of this manner may be faster than that of the first manner mentioned above.

```
Unsigned Int32 Search ID ( Target ID )
{
    Unsigned Int32 Index = 0;
    While ( Index < MaxArrayIndex )
    {
        If ( node identification array[Index] == Target ID && position
valid array[Index] = = 1 )
        {
            Return Index;
        }
        Else
        {
            Index ++;
        }
    }
    Return 2³²–1;
}
```

The basic operation of the linklist includes insertion and deletion in addition to traversal. There is no substantial difference between the linklist implemented according to the embodiment of the present invention and the related art when the deletion operation is executed. In comparison with the related art, the linklist implemented according to the embodiment of the present invention needs an additional searching operation, i.e., an operation for searching an unused storage position in the consecutive storage area, when the insertion operation is executed. Since the data area of a node is generally initialized in the insertion operation in the related art and the time spent by the operation is far higher than the searching operation made in the cache or TCM, the overload of the additional searching operation in the embodiment of the present invention is negligible.

It can be known from the above description that if the number of the nodes when the linklist is used never exceeds the number of the nodes allocated when the linklist is initialized, the performance of the traversal operation will be far higher than a normal linklist in the related art since both the node identifications and the node pointers of the linklist are retained in the TCM.

In the embodiment of the present invention, advantages of the cache can be fully utilized by the node pointer array, the node identification array and the position valid array retained in the approximately consecutive physical space, even when the number of the nodes when the linklist is used exceeds that allocated when the linklist is initialized all the time.

Figure 4A:
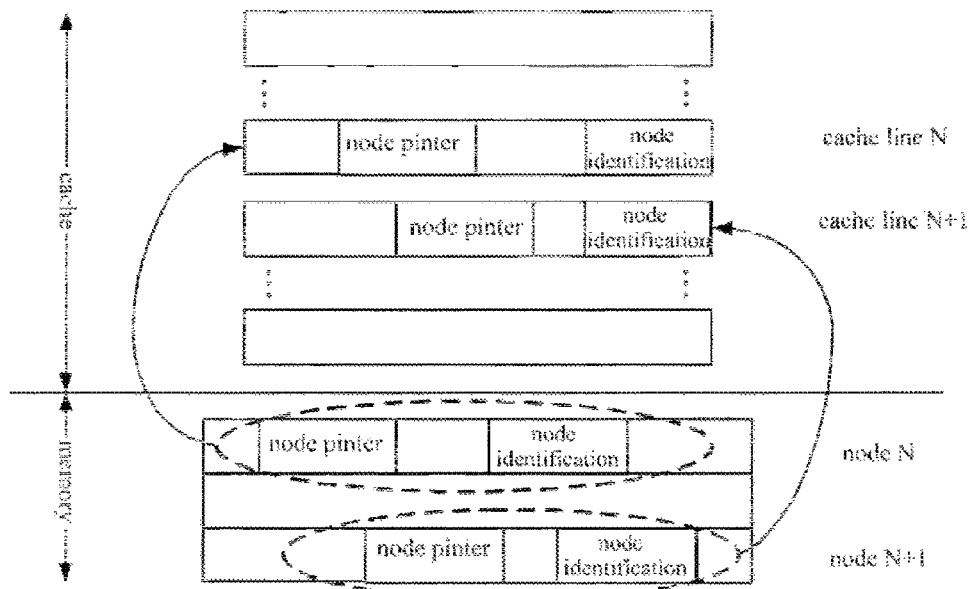
FIG. 4a is an illustrative diagram of caching node pointers in a traversing operation of a linklist in the related art.
Figure 4B:
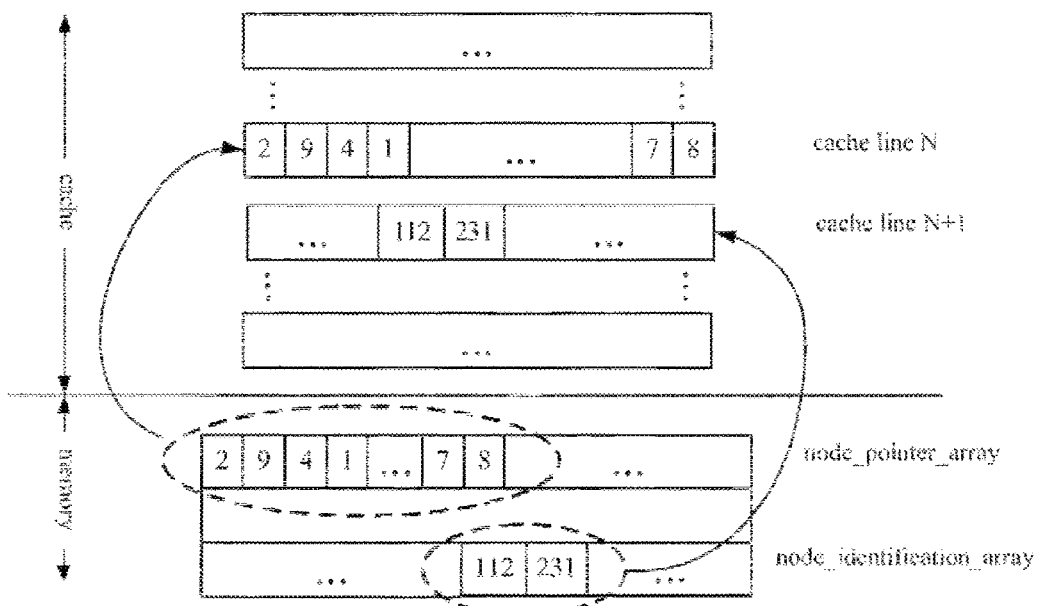
FIG. 4b is an illustrative diagram of caching node pointers in a traversing operation of a linklist in the embodiment of the present invention.

FIGS. 4a and 4b are illustrative diagrams of caching node pointers in traversing operations of a linklist implemented according to the related art and a linklist implemented according to the embodiment of the present invention respectively. Assumes that the length of the cache line is 128 bytes and that of the node pointer is 4 bytes. In the case of performing the traversal operation in the linklist implemented according to the embodiment of the present invention, when a certain node pointer does not hit the target in the cache, 32 node pointers adjacent thereto will be loaded as shown in FIG. 4b. By contrast, only 1 node pointer can be loaded in the, linklist implemented according to the related art as shown in FIG. 4a. If the computation is performed in the case of the number of the nodes traversed being N, only 2*N/(128/4) cache lines are need to be occupied in the linklist implemented according to the embodiment of the present invention; while N cache lines are needed to be occupied in the existing technical solution. Similar situation also exists in the node identification. In this way, the embodiment of the present invention not only reduces the frequency for updating the cache lines, but also decreases the competition for cache sources between the traversal operation and other applications, when the resource of the system cache is not rich.

Figure 5:
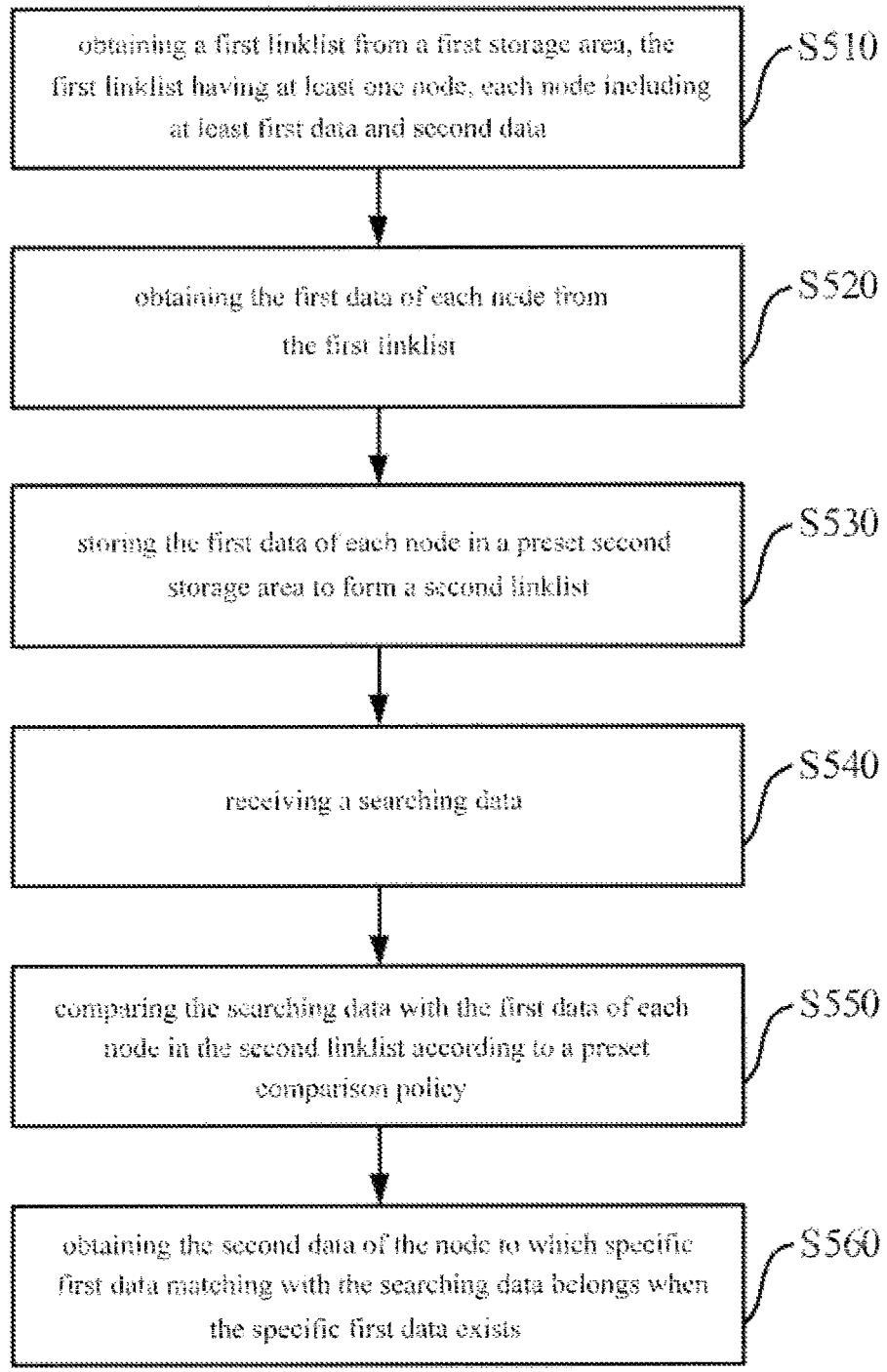
FIG. 5 is an illustrative flowchart of a method for searching data according to an embodiment of the present invention.

FIG. 5 is an illustrative flowchart of a method for searching data according to an embodiment of the present invention. As shown in FIG. 5, the method for searching data according to the present embodiment mainly includes the steps of:

in step S510, acquiring a first linklist from a first storage area, the first linklist having at least one node, each node including at least first data and second data;

in step S520, acquiring the first data of each node from the first linklist;

in step S530, storing the first data of each node in a preset second storage area to form a second linklist;

in step S540, receiving a searching data;

in step S550, comparing the searching data with the first data of each node in the second linklist; and in step S560, acquiring the second data of the node to which specific first data matching with the searching data belongs when there is the specific first data.

In the above-mentioned step S550, a policy for the comparison such as ordinal comparison, dichotomy comparison, random comparison and the like may be preset.

The first storage area corresponds to a first accessing speed while the second storage area corresponds to a second accessing speed, and the second accessing speed is higher than the first accessing speed, thereby it is possible to improve the speed at which the electrical apparatus searches data, and thus to improve the work efficiency.

One typical example for the data searching method is searching a certain contact person's telephone number in a contact list. In this example, it is exemplified that the name of the contact person is the searching data and the cell phone number is the target data to be searched. In this case, many kinds of communication information, such as a telephone number of a fixed line, a cell phone number, an e-mail address, a mailing address, a zip code and the like, for a lot of contact persons are stored in the contact list, in which all the communication information of one contact person is one node. In the searching method of the related art, all the communication information of several persons is generally read from the contact list at one time and consecutively stored in a storage area, and then the names of the contact persons stored in the storage area are compared with the name of the contact person input by the user. If there is no match, all the communication information of another group of several persons is read and stored in the storage area and the searching is continuously performed until the certain contact person is found. Finally, the cell phone number of this contact person is output. Some technical solutions in the related art may further output all of the other communication information in addition to the cell phone number. For such application, in the present invention, the name of the contact person is read from the contact list and stored in a new storage area to form a new linklist, and then the new linklist is searched in accordance with the name of the contact person input by the user. If this contact person is found, the cell phone number of this contact person is output by returning to the contact list. In this case, the space for storing this telephone directory is the first storage area in the embodiment shown in FIG. 5. All the communication information of all contact persons in the contact list are stored in the first linklist and the name and the cell phone number of each contact person are respectively the first data and the second data mentioned above. The new storage area is the above-mentioned second storage area, and the names of all the contact persons are stored in the second linklist. When the matched name is found, the cell phone number of this contact person is read and output by returning to the first linklist, thus the searching for the cell phone number is finished.

The difficulty encountered in applications for more complex data searching will become apparent in conjunction with the simple example of above-mentioned telephone directory. Obviously, it should be clarified that the above-mentioned searching for the telephone directory is only one simple example within the concept of the searching method according to the present invention; however, the searching method according to the present invention should riot be thus construed as only be applicable to searching the telephone directory or to applications whose difficulty resembles that of searching the telephone directory.

Figure 6:
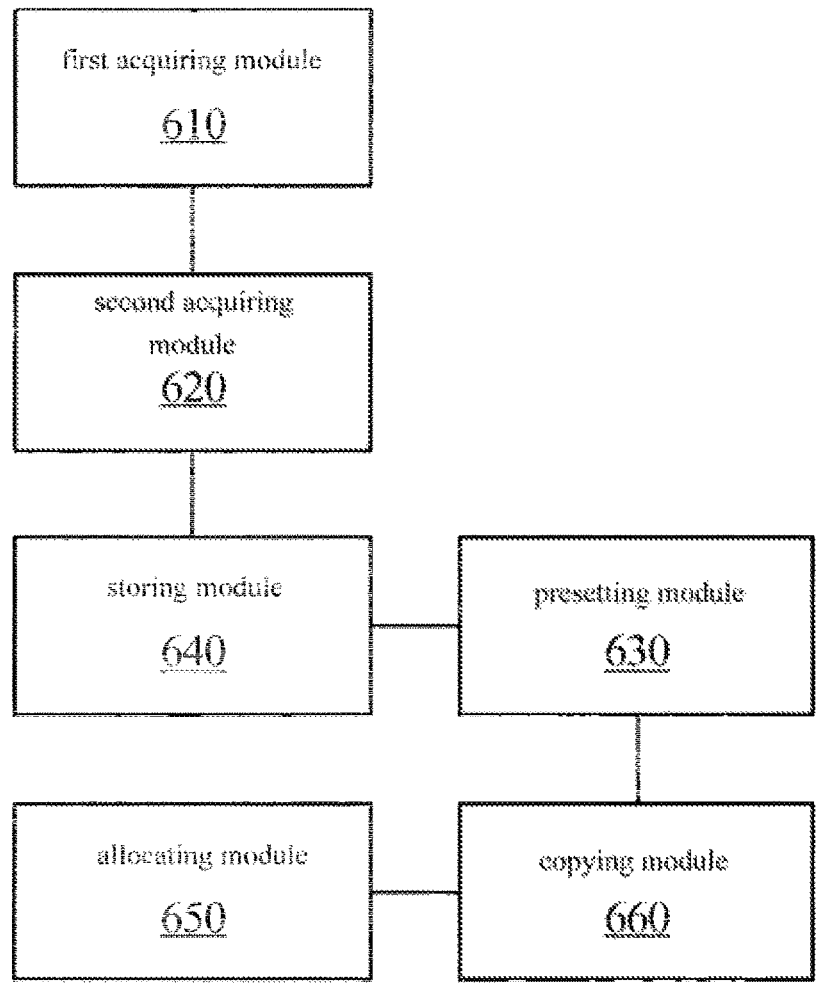
FIG. 6 is an illustrative diagram of the constitution of a system for creating a linklist according to an embodiment of the present invention.

FIG. 6 is an illustrative diagram of the constitution of a system for creating a linklist according to an embodiment of the present invention. Combining with the embodiment shown in FIG. 1 and the application instance shown in FIG. 2, the system for creating a linklist may include a first acquiring module 610, a second acquiring module 620, a presetting module 630, a storing module 640, an allocating module 650 and a copying module 660, in which:

the first acquiring module 610 is used to acquire a first linklist from a first storage area, the first linklist having at least one node, each node including at least first data;

the second acquiring module 620 is used to acquire the first data of each node from the first linklist;

the presetting module 630 is used to preset a second storage area;

the storing module 640 is used to store the first data in the second storage area to form a second linklist;

the allocating module 650 is used to allocate a third storage area when storage space of the second storage area is not enough to continue storing the first data acquired from the first storage area; the space of the third storage area is larger than, optionally twice as large as, that of the second storage area; and the copying module 660 is used to copy the second linklist in the second storage area into the third storage area, and the storage space of the second storage area may be released after copying the second linklist into the third storage area.

The first storage area corresponds to a first accessing speed while the second storage area corresponds to a second accessing speed, and the second accessing speed is higher than the first accessing speed, thereby it is possible to improve the speed at which the electrical apparatus searches data, and thus to improve the work efficiency.

The storing module 640 is optionally a tightly coupled memory (TCM) which can significantly improve the speed for searching data due to the high speed accessing characteristic. In the case of the second storage area preset by the presetting module 630 being a TCM, the allocating module 650 mentioned above optionally reallocates the storage area in the space of the main memory while it enlarges the storage space of the second storage area.

It should be indicated that the system for creating a linklist shown in FIG. 6 includes the allocating module 650 and the copying module 660 so as to continue storing the first data when the storage space of the second storage area is not sufficient. However, the system for creating a linklist may not necessarily include the allocating module 650 and the copying module 660. That is to say, in the embodiment of the present invention, the system for creating a linklist may include only the first acquiring module 610, the second acquiring module 620, the presetting module 630 and the storing module 640, in which:

the first acquiring module 610 is used to acquire a first linklist from a first storage area, the first linklist having at least one node, each node including at least first data;

the second acquiring module 620 is used to acquire the first data of each node from the first linklist;

the presetting module 630 is used to preset a second storage area; and the storing module 640 is used to store the first data in the second storage area to form a second linklist.

Figure 7:
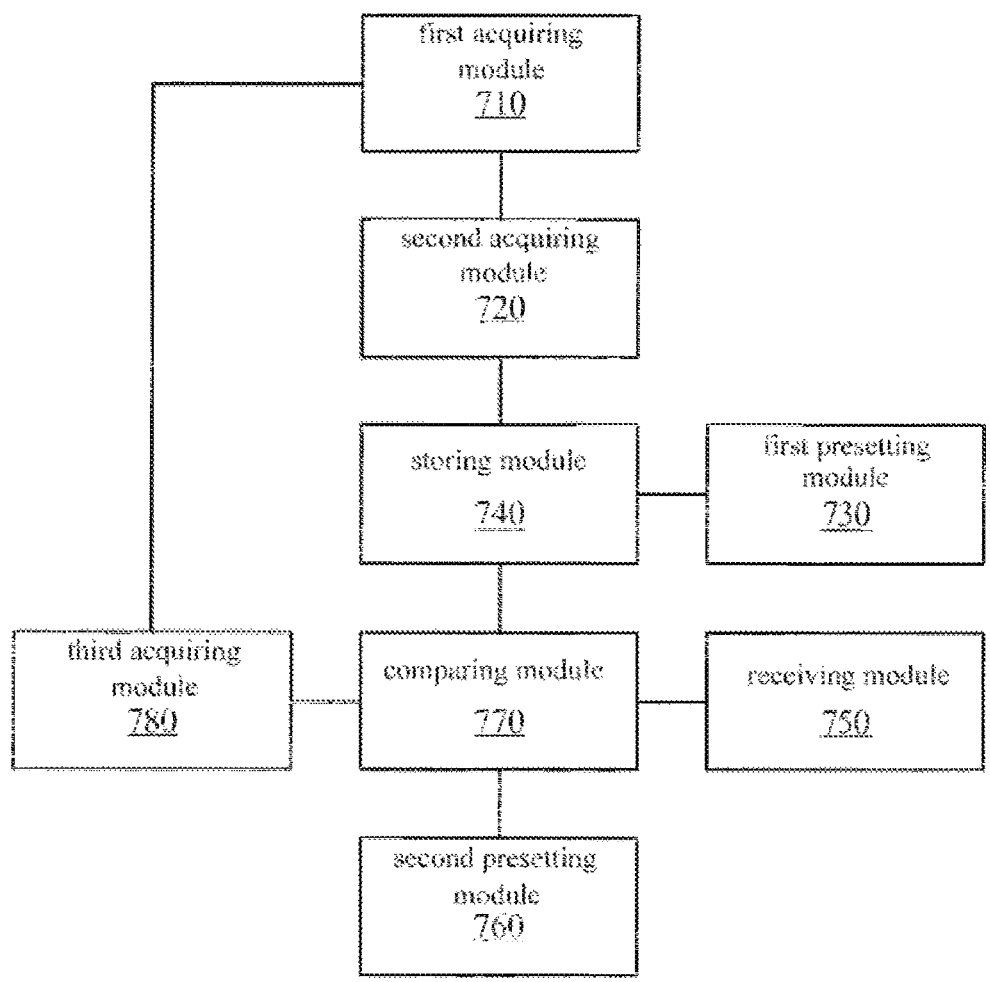
FIG. 7 is an illustrative diagram of the constitution of a system for searching data according to an embodiment of the present invention.

FIG. 7 is an illustrative diagram of the constitution of a system for searching data according to an embodiment of the present invention. As shown in FIG. 7, the system for searching data according to the present embodiment mainly includes a first acquiring module 710, a second acquiring module 720, a first presetting module 730, a storing module 740, a receiving module 750, a second presetting module 760, a comparing module 770 and a third acquiring module 780, in which:

the first acquiring module 710 is used to acquire a first linklist from a first storage area, the first linklist haying at least one node, each node including at least first data and second data;

the second acquiring module 720 is used to acquire the first data of each node from the first linklist;

the first presetting module 730 is used to preset a second storage area;

the storing module 740 is used to store the first data of each node in the second storage area to form a second linklist;

the receiving module 750 is used to receive searching data;

the second presetting module 760 is used to preset a comparison policy;

the comparing module 770 is used to compare the searching data with the first data of each node in the second linklist according to the preset comparison policy; and the third acquiring module 780 is used to acquire the second data of the node to which specific first data matching with the searching data belongs when there is the specific first data.

The comparison policy preset by the second presetting module 760 mentioned above includes for example ordinal comparison, dichotomy comparison, random comparison and the like.

The first storage area corresponds to a first accessing speed while the second storage area corresponds to a second accessing speed, and the second accessing speed is higher than the first accessing speed, thereby it is possible to improve the speed at which the electrical apparatus searches data, and thus to improve the work efficiency.

The storing module 740 is optionally a tightly coupled memory (TCM) which can significantly improve the speed for searching data due to the high speed accessing characteristic.

It should be clarified that steps shown, in the flowcharts in the accompanying drawings, may be executed in a computer system as a set of computer executable instructions, and although a logical order is shown in the flowcharts, the shown or described steps may be executed in different orders from those described herein under certain circumstances. In addition, it should be appreciated by those skilled in the art that various modules or various steps according to the present invention mentioned above may be implemented in general purpose computing devices, and either integrated into a single computing device or distributed over a network consisting of multiple computing devices. Optionally, they may be implemented in program codes executable by the computing devices, and thus stored in storage devices for being executed by the computing devices. Otherwise, they may be manufactured as individual integrated circuit modules respectively; or multiple modules or steps thereof may be implemented by being manufacture as a single integrated circuit module. Therefore, the present invention is not limited to any combination of specific hardware and software.

While the specific modes for carrying out the invention have been disclosed as above, the contents described are set forth only in order to provide a thorough understanding of specific modes employed by the present invention and not to limit the present invention. Modifications and variations in forms and details of the implementation can be made by any of those skilled in the art to which the present invention belongs, without departing from the spirit and scope disclosed in the present invention, the protective scope of which must be still defined by the appended claims.

What is claimed is:

1. A method for creating a linklist, comprising:
    acquiring a first linklist from a first storage area, said first linklist having at least one node, each of said node including at least first data that comprises identification information for identifying the node and a pointer of said node and second data;
    acquiring said identification information and said pointer and not the second data of each of said node from said first linklist; and
    storing said identification information and said pointer and not the second data in a preset second storage area to form a second linklist,
    wherein the first storage area corresponds to a first accessing speed and the second storage area corresponds to a second accessing speed, and the second accessing speed is higher than the first accessing speed.

2. The method according to claim 1, wherein: said second storage area is a consecutive storage space.

3. The method according to claim 1, further comprising:
    allocating a third storage area when the space of said second storage area is not enough to continue storing said second linklist; and
    copying said second linklist in said second storage area into said third storage area,
    wherein, the space of said third storage area is larger than that of said second storage area.

4. A method for searching data, comprising:
    acquiring a first linklist from a first storage area, said first linklist having at least one node, each of said node including at least first data that comprises identification information for identifying the node and a pointer of said node and second data;
    acquiring said identification information and said pointer and not the second data of each of said node from said first linklist;
    storing said identification information and said pointer and not the second data of each of said node in a preset second storage area to form a second linklist;
    receiving searching data;
    comparing said searching data with said first data of each of said node in said second linklist; and
    acquiring the second data of the node to which specific first data matching with said searching data belongs when said specific first data exists,
    wherein the first storage area corresponds to a first accessing speed and the second storage area corresponds to a second accessing speed, and the second accessing speed is higher than the first accessing speed.

5. A system for creating a linklist in a computer that includes a processor and a memory, comprising:
    a first acquiring module, configured for acquiring a first linklist from a first storage area, said first linklist having at least one node, each of said node including at least first data that comprises identification information for identifying the node and a pointer of said node and second data;
    a second acquiring module, configured for acquiring said identification information and said pointer and not the second data of each node from said first linklist;
    a presetting module, configured for presetting a second storage area; and
    a storing module, configured for storing said identification information and said pointer and not the second data in said second storage area to form a second linklist,
    wherein the first storage area corresponds to a first accessing speed and the second storage area corresponds to a second accessing speed, and the second accessing speed is higher than the first accessing speed.

6. The system according to claim 5, wherein: said presetting module, configured for presetting a consecutive storage space as said second storage area.

7. The system according to claim 5, further comprising:
    an allocating module, configured for allocating a third storage area when the space of said second storage area is not enough to continue storing said second linklist; and
    a copying module, configured for copying said second linklist in said second storage area into said third storage area,
    wherein, the space of said third storage area is larger than that of said second storage area.

8. A system for searching data, in a computer that includes a processor and a memory comprising:
    a first acquiring module, configured for acquiring a first linklist from a first storage area, said first linklist having at least one node, each of said node including at least first data that comprises identification information for identifying the node and a pointer of said node and second data;
    a second acquiring module, configured for acquiring said identification information and said pointer and not the second data and not the second data of each of said node from said first linklist;
    a first presetting module, configured for presetting a second storage area;
    a storing module, configured for storing said identification information and said pointer and not the second data and not the second data of each of said node in said second storage area to form a second linklist;
    a receiving module, configured for receiving searching data;

a second presetting module, configured for presetting a comparison policy;

a comparing module, configured for comparing said searching data with said first data of each of said node in said second linklist according to said comparison policy; and a third acquiring module, configured for acquiring the second data of the node to which specific first data matching with said searching data belongs when said specific first data exists, wherein the first storage area corresponds to a first accessing speed and the second storage area corresponds to a second accessing speed, and the second accessing speed is higher than the first accessing speed.

* * * * *